United States Patent Office

2,901,470
Patented Aug. 25, 1959

2,901,470

PROCESS OF PREPARING LINEAR POLYMERS OF MULTIVINYL AROMATIC COMPOUNDS

William Franklin Gresham, Wilmington, Del., assignor to E. I. du Pont de Nemours and Company, Wilmington, Del., a corporation of Delaware No Drawing. Application November 22, 1954
Serial No. 470,497

4 Claims. (Cl. 260—93.5)

This invention relates to a novel process for the preparation of polymers of multivinyl aromatic compounds.

Low molecular weight, linear polymers have been prepared heretofore from divinyl benzene, although the published art on this subject states that even small percentages of divinyl benzene causes the formation of cross-linked polymers. A novel process has now been discovered, by means of which linear polymers of divinyl benzene, as well as other multivinyl aromatic compounds, may be prepared.

It is an object of this invention to provide a process for the polymerization of multivinyl aromatic compounds into linear polymers. From the following description other objects will become apparent to those skilled in the art.

The above objects are accomplished in accordance with the processes of this invention by subjecting a multivinyl aromatic compound to polymerization conditions in the presence of a coordination catalyst as described hereinbelow.

The following example illustrates the processes and products of this invention.

*Example 1.*—A catalyst mixture consisting of 0.005 mole of titanium tetrachloride and 8 ml. of a mixture of lithium aluminum alkyls was added to 100 ml. of cyclohexane in a polyethylene bottle. The lithium aluminum alkyls were prepared by mixing 20 grams of lithium aluminum hydride and 225 grams of vinyl cyclohexene, refluxing the mixture for 2–3 hours, and diluting the product to 1 liter with xylene. Five grams of commercial divinyl benzene was added slowly to the mixture in the bottle, and the bottle was shaken during the addition. Heat was evolved during this period. The shaking was continued for 10 minutes, following which the mixture was poured into methanol, causing the polymer product to precipitate. After washing the precipitate with methanol and acetone, and drying in a vacuum oven at 60° C., there was recovered 3 grams of a brittle crusty powder. The powder was a linear polymer of divinyl benzene which was soluble in xylene and had a density of 1.04 The polymer was similar to those polymers having an inherent viscosity of about 0.5, measured in decalin at 125° C. Films pressed from the powder were stiff, rather brittle, and insoluble in xylene or any other solvent, indicating cross-linking of the polymer resulting from the high temperature.

It is understood that the foregoing example is illustrative, and that this invention is intended to encompass processes for preparing polymers of other multivinyl aromatic compounds.

The monomers included within the scope of the process of this invention are those having the general formula

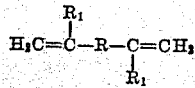

in which R is an aromatic radical, and $R_1$ is selected from the group consisting of hydrogen and methyl. Specific materials included within this definition are divinyl benzene, divinyl toluene, divinyl xylene, divinyl naphthalene, trivinyl benzene, alpha,alpha'-divinyl xylene, divinyl dichlorobenzene, and other similar substituted and unsubstituted multivinyl aromatic compounds.

The term "coordination catalyst" wherever used in this description and in the appended claims is defined as a catalyst formed by the reaction of a polyvalent metal compound, specifically defined below, with a reducing agent, also specifically defined below, the reducing agent being present in sufficient amount to reduce the valence state of said polyvalent metal, at least in part, to less than 3. The polyvalent metal compounds are selected from the group consisting of those compounds having the formula $M_nX_m$ and $M_n(OR)_m$ wherein M is an element from the group consisting of Ti, Zr, Ce, V, Nb, Ta, Cr, Mo, and W, X is a halide, R is selected from the group consisting of monovalent hydrocarbon radicals and monovalent substituted hydrocarbon radicals, and $n$ and $m$ are integers. The reducing agent in the above definition is an organometallic compound having at least one metal-hydrocarbon bond.

Specific examples of the polyvalent metal halides and esters included in the above definition are titanium tetrachloride, titanium tetrafluoride, zirconium tetrachloride, niobium pentachloride, vanadium tetrachloride, tantalum pentabromide, cerium trichloride, molybdenum pentachloride, tungsten hexachloride, tetra(2-ethyl hexyl)-titanate, tetrapropyl titanate, titanium oleate, octylene glycol titanate, triethanolamine titanate, tetraethyl zirconate, tetra(chloroethyl) zirconate, and the like.

Specific examples of the reducing agents included in the above definition are phenyl magnesium bromide, lithium aluminum tetraalkyl, dimethyl cadmium, and the like.

The exact composition of the "coordination catalyst" when it is in its active state, capable of polymerizing ethylenically unsaturated compounds is not known. However, it is known that when one of these polyvalent metal compounds is mixed with a sufficient amount of an organo metallic reducing agent, such as lithium aluminum tetraalkyl, to reduce the valence of the polyvalent metal to less than 3, and preferably to 2, the polyvalent metal composition becomes a highly active polymerization catalyst. In this highly active state the polyvalent metal composition is capable of forming coordination complexes with ethylenically unsaturated monomers causing them to polymerize to a high molecular weight linear polymer.

The reaction conditions of the polymerization process are extremely mild. Pressures of 1 to 200 atmospheres are normally employed. Temperatures of 0° to 300° C. are preferred. The most satisfactory results are obtained when the polymerization medium is free of moisture or other sources of hydroxyl groups, free of oxygen, and free of ketones, esters, or aldehydes.

The polymers of this invention find their primary use in their ability to be cross-linked by heating, by treatment with acid catalysts, or by treatment with known free-radical catalysts. The polymers of this invention are thermoplastic before being cross-linked, and therefore may be molded into films, spun into fibers and filaments, used in coating compositions, or cured to elastomeric materials. These polymers may also be vulcanized with S or $SO_2$ and suitable catalysts according to methods known in the art of rubber chemistry.

I claim:

1. A process for preparing linear polymers of multivinyl aromatic hydrocarbon compounds comprising subjecting a monomeric, vinyl, aromatic hydrocarbon compound, having 2–3 vinyl groups per molecule and being selected from the group consisting of unsubstituted vinyl aromatic hydrocarbons and halogen-substituted vinyl aromatic hydrocarbons, to polymerization conditions comprising a pressure of 1–200 atmospheres and a temperature of 0°–300° C. in the presence of a mixture of titanium tetrahalide and a reducing agent having at least one metal-to-hydrocarbon bond, said reducing agent being present in an amount sufficient to cause the average valence of all of the said titanium to be reduced to less than 3, and recovering a linear polymer of said vinyl aromatic hydrocarbon compound.

2. The process of claim 1 in which said vinyl aromatic compound is divinyl benzene.

3. A process for preparing a linear polymer of divinyl benzene comprising contacting divinyl benzene with a mixture of titanium tetrachloride and lithium aluminum tetraalkyl at a pressure of 1–200 atmospheres and a temperature of 0° to 300° C. in the absence of hydroxyl and oxygen, and recovering a linear polymer of divinyl benzene, the amount of said lithium aluminum tetraalkyl being sufficient to reduce the average valence of all of said titanium at least to 2.

4. A process for preparing a linear polymer of a vinyl aromatic hydrocarbon compound having 2–3 vinyl groups per molecule and being selected from the group consisting of unsubstituted vinyl aromatic hydrocarbons and halogen-substituted vinyl aromatic hydrocarbons, comprising contacting said vinyl aromatic hydrocarbon compound at a pressure of 1–200 atmospheres and a temperature of 0°–300° C. with the reaction product of a polyvalent metal compound and a sufficient amount of a reducing agent to reduce the average valence of all of said polyvalent metal to less than 3, said polyvalent metal compound being a member of the group consisting of esters and halides of titanium, zirconium, cerium, vanadium, niobium, tantalum, chromium, molybdenum, and tungsten, and said reducing agent being an organometallic compound having at least one metal-hydrocarbon bond.

References Cited in the file of this patent

UNITED STATES PATENTS

| | | |
|---|---|---|
| 2,405,817 | D'Alelio | Aug. 13, 1946 |
| 2,440,498 | Young et al. | Apr. 27, 1948 |
| 2,472,589 | Hersberger | June 7, 1949 |
| 2,591,587 | Mowry | Apr. 1, 1952 |
| 2,692,251 | D'Alelio | Oct. 19, 1954 |
| 2,721,189 | Anderson et al. | Oct. 18, 1955 |

OTHER REFERENCES

Morton: J. Am. Chem. Soc., 74, 5434–6 (1952).